United States Patent
Hirao et al.

(10) Patent No.: US 8,296,010 B2
(45) Date of Patent: Oct. 23, 2012

(54) SUSPENSION CONTROL APPARATUS

(75) Inventors: Ryusuke Hirao, Matsudo (JP); Masaaki Uchiyama, Tokyo (JP); Nobuyuki Ichimaru, Yokohama (JP); Takahide Kobayashi, Kawaguchi (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 320 days.

(21) Appl. No.: 12/765,241

(22) Filed: Apr. 22, 2010

(65) Prior Publication Data
US 2011/0035089 A1 Feb. 10, 2011

(30) Foreign Application Priority Data
Aug. 4, 2009 (JP) ................. 2009-181446

(51) Int. Cl.
B60G 17/016 (2006.01)
(52) U.S. Cl. .................. 701/38; 280/5.507
(58) Field of Classification Search ............ 701/36, 701/37, 38, 70; 280/5.507, 53.508, 5.513, 280/5.515, 5.508, 5.51
See application file for complete search history.

(56) References Cited

U.S. PATENT DOCUMENTS

| | | | | |
|---|---|---|---|---|
| 7,672,766 B2* | 3/2010 | Poilbout | | 701/38 |
| 7,949,445 B2* | 5/2011 | Poilbout | | 701/37 |
| 8,112,199 B2* | 2/2012 | Poilbout | | 701/37 |
| 2008/0300752 A1* | 12/2008 | Poilbout | | 701/37 |
| 2009/0102145 A1* | 4/2009 | Moriki et al. | | 280/5.507 |
| 2009/0234537 A1* | 9/2009 | Tomida et al. | | 701/38 |
| 2010/0211270 A1* | 8/2010 | Chin et al. | | 701/44 |
| 2011/0029198 A1* | 2/2011 | Mizuta et al. | | 701/38 |
| 2011/0166744 A1* | 7/2011 | Lu et al. | | 701/34 |
| 2012/0029770 A1* | 2/2012 | Hirao et al. | | 701/38 |
| 2012/0078470 A1* | 3/2012 | Hirao et al. | | 701/38 |

FOREIGN PATENT DOCUMENTS

| | | |
|---|---|---|
| JP | 8-2231 | 1/1996 |
| JP | 2007-290650 | 11/2007 |
| JP | 2007290650 A * | 11/2007 |

OTHER PUBLICATIONS

JP 2007-290650 English translation.*

* cited by examiner

*Primary Examiner* — Ruth Ilan
*Assistant Examiner* — Karen A Beck
(74) *Attorney, Agent, or Firm* — Wenderoth, Lind & Ponack, LLP

(57) ABSTRACT

A suspension control apparatus enabling a driver to obtain an excellent driving feeling. The suspension control apparatus controls an actuator disposed between a vehicle body and a wheel of a vehicle. The suspension control apparatus includes a lateral acceleration detector operable to detect a lateral acceleration, a lateral jerk detector operable to detect a lateral jerk, and a suspension controller operable to control the actuator to change a pitch of the vehicle based the detected lateral acceleration and lateral jerk.

7 Claims, 14 Drawing Sheets (A)　　　　　(B)　　　　　(C)

SUSPENSION CONTROL APPARATUS

BACKGROUND OF THE INVENTION

The present invention relates to a suspension control apparatus.

A large number of conventional suspension control apparatuses aim to reduce a change in the posture of a vehicle. For example, there is known a suspension control apparatus configured to calculate a lateral jerk by temporally differentiating a lateral acceleration calculated from a steering angle and a vehicle speed, and control damping force adjustable shock absorbers disposed at four wheels according to the calculated lateral jerk so that the characteristics thereof are set to hard, thereby increasing damping forces generated by these shock absorbers and reducing a roll motion generated during cornering (for example, refer to Japanese Patent Application Public Disclosure No. HEI 8-2231).

Generally, a passenger such as a driver is sensitive to a behavior of a vehicle, and prefers a smooth behavior. When traveling around a corner, he/she prefers a smoothly changing behavior resulting from harmonized lateral acceleration and longitudinal acceleration of the vehicle, like the behavior of a vehicle when a skilled driver operates the vehicle. On the basis of this knowledge, Japanese Patent Application Public Disclosure 2007-290650 discloses a vehicle operation control apparatus configured to control acceleration and deceleration of a vehicle with use of lateral jerk information.

Since conventional suspension apparatuses, like the one disclosed in Japanese Patent Application Public Disclosure No. HEI 8-2231, do not focus on a smooth behavior of a vehicle, they may fail to provide an excellent driving feeling to a passenger when they extremely reduce a change in the posture of a vehicle. As will be used herein, the term "driving feeling" is used to refer to an impression which a passenger receives from a behavior of a vehicle, and the term "excellent driving feeling" is used to refer to an impression that "the vehicle runs smoothly", "the vehicle turns a corner skillfully", or/and "cornering is continuous".

On the other hand, conventional vehicle operation control apparatuses, like the one disclosed in Japanese Patent Application Public Disclosure No. 2007-290650, intervene in driver's acceleration/deceleration operation, and generates acceleration or deceleration out of synchronization with the driver's intended timing. Therefore, they may also fail to provide the excellent driving feeling. In the first place, such a vehicle operation control apparatus belongs to a completely different technical field from that of suspension control apparatus.

SUMMARY OF THE INVENTION

Therefore, an object of the present invention is to provide a suspension control apparatus enabling a driver to have the excellent driving feeling during cornering.

The present invention provides a suspension control apparatus for controlling an actuator disposed between a vehicle body and a wheel of a vehicle, the suspension control apparatus comprising:

a lateral jerk detector operable to detect a lateral jerk; and a suspension controller operable to control the actuator to change a pitch of the vehicle based the lateral jerk detected by the lateral jerk detector.

DETAILED DESCRIPTION OF THE INVENTION

A cornering operation by a skilled driver is performed in the following way. (1) He/she starts to turn the steering wheel, and at the same time, slows down the vehicle by pressing down the brake pedal. (2) He/she eases the depression of the brake pedal while further turning the steering wheel. (3) He/she releases the brake pedal upon turning the steering wheel to a predetermined angle. (4) He/she speeds up the vehicle by pressing down the accelerator pedal while returning the steering wheel, and thereby completes the cornering operation.

Figure 12:
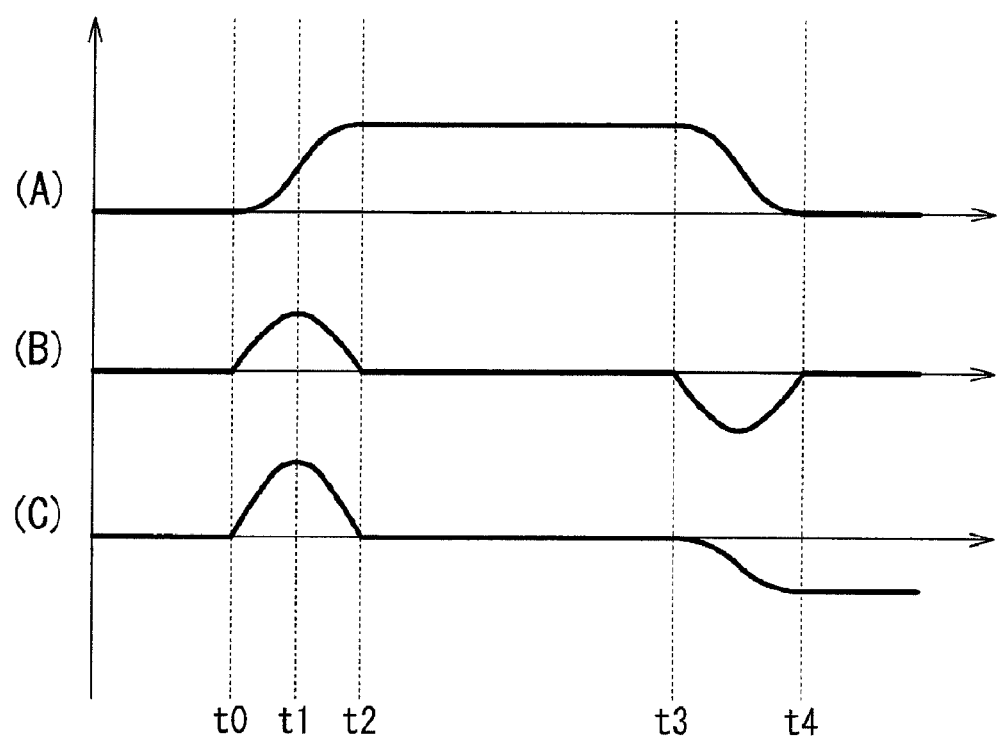
FIG. 12 illustrates a lateral acceleration (A), a lateral jerk (B), and a longitudinal acceleration (C) during a cornering operation by a skilled driver.

Referring to FIG. 12, a description will be given of how the lateral acceleration (A), the lateral jerk (B) which is the temporal differentiation value of the lateral acceleration, and the longitudinal acceleration (C) (corresponding to the pitch angle) of the vehicle during this operation are changed over time. Here, the lateral acceleration and the lateral jerk are said to be positive when they are at the cornering outer side direction, and the longitudinal acceleration is said to be positive when it is in the speed reduction direction.

First, (1) at time t0, a lateral acceleration is generated due to the start of turning of the steering wheel. The lateral acceleration at this time is positive. At the same time, a longitudinal acceleration is generated due to the depression of the brake pedal.

Next, (2) at time t1, while the lateral acceleration is increased due to the further turning of the steering wheel, the lateral jerk starts to be reduced. In addition, the longitudinal acceleration also starts to be reduced since the depression of the brake pedal is eased.

Then, (3) at time t2, since the steering wheel is maintained at the predetermined angle, the lateral acceleration is maintained at the maximum value while the lateral jerk becomes zero. At the same time, the longitudinal acceleration becomes zero since the depression amount of the brake pedal becomes zero.

After that, (4) at time t3, due to the return of the steering wheel, the lateral acceleration is reduced, and the lateral jerk becomes negative. The longitudinal acceleration becomes negative due to the depression of the accelerator pedal.

Finally, the cornering operation is finished by completely returning the steering wheel (time t4).

From time t3 to time t4, (B) and (C) show the same graph if the acceleration component by the accelerator pedal is removed.

As mentioned above, it is known that the behavior of the vehicle generated from such a cornering operation provides the excellent driving feeling to a driver. That is, a driver can obtain the excellent driving feeling through a feeling of a longitudinal acceleration coordinated with a lateral jerk.

However, since a suspension control apparatus is an apparatus for controlling a force generated between a vehicle body and a wheel, it is difficult to generate a longitudinal acceleration of a vehicle with use of the suspension control apparatus.

On the other hand, in the above-mentioned cornering operation performed by a skilled driver, the lateral acceleration and the longitudinal acceleration are changed in coordination with each other. The longitudinal acceleration induces a pitch motion of a vehicle.

The inventors of the present invention have focused on this aspect and found that it may be possible to provide the excellent driving feeling to a driver through a pitch motion directly coordinated with a lateral acceleration. The specific configuration is as follows.

A suspension control apparatus, which is adapted to control an actuator disposed between a vehicle body and a wheel of a vehicle, comprises a lateral acceleration detector for detecting a lateral acceleration, and a lateral jerk detector for detecting a lateral jerk, and a suspension controller for controlling the actuator so as to change a pitch of the vehicle based on the detected lateral acceleration and the detected lateral jerk.

The above-mentioned suspension control apparatus controls the actuator such that the vehicle has a positive pitch when the lateral acceleration and the lateral jerk have a same sign, or such that the vehicle has a negative pitch when the lateral acceleration and the lateral jerk have different signs. Here, the pitch is said to be positive when the front wheel side has a lower height than that of the rear wheel side (so-called a nosedive state).

Returning to FIG. 12, the actuator is controlled such that the vehicle has a positive pitch from time t0 until time t2, and the actuator is controlled such that the vehicle has a negative pitch from time t3 until time t4.

This control is expected to bring about at least any of the following effects.
(1) A driver can obtain the excellent driving feeling during cornering.
(2) According to the operation control apparatus of the vehicle disclosed in Japanese Patent Application Public Disclosure No. 2007-290650, since it controls a longitudinal acceleration by intervening in an acceleration/deceleration operation of a driver, the driver might have an uneasy feeling to the behavior of the vehicle. However, according to the suspension control apparatus configured as mentioned above, it does not control a longitudinal acceleration by intervening in an acceleration/deceleration operation of a driver, so that such uneasiness can be reduced.

Further, if the suspension control apparatus configured as mentioned above is employed in a system controlling a longitudinal acceleration by intervening in an acceleration/deceleration operation of a driver, such as the invention disclosed in Japanese Patent Application Public Disclosure No. 2007-290650, it is possible to reduce the amount of the control of a longitudinal acceleration at the time of intervention in an acceleration/deceleration operation, so that the driver's uneasiness can be reduced.
(3) Further, an unskilled driver tends to sufficiently slow down the vehicle before entering a corner. In this case, the acceleration/deceleration control should not be performed in consideration of fuel consumption, but then, an unskilled driver cannot obtain the excellent driving feeling during cornering. However, according to the suspension control apparatus configured as mentioned above, the control can be performed without increasing fuel consumption even if a vehicle goes corner at a low speed, thereby enabling an unskilled driver to obtain the excellent driving feeling.

The above-mentioned actuator may be embodied by an apparatus or unit adapted to be disposed between a vehicle body and a wheel of a vehicle so as to support the vehicle body while its force for supporting the vehicle body can be controlled from the outside. Examples of the actuator include a damping force adjustable shock absorber and an active suspension which will be described later. For example, if a damping force adjustable shock absorber is employed, the vehicle can have a positive pitch by a control of the compression-side damping force characteristic at the front wheel side to be set to soft, and the compression-side damping force characteristic at the rear wheel side to be set to hard.

The above-mentioned lateral acceleration detector may be embodied by an apparatus or unit operable to detect a lateral acceleration acting on a vehicle when the vehicle corners. Examples thereof include an acceleration sensor operable to detect a lateral acceleration.

The above-mentioned lateral jerk detector may be embodied by an apparatus or unit operable to detect a lateral jerk acting on a vehicle when the vehicle corners. Examples thereof include a combination of an acceleration sensor operable to detect a lateral acceleration and a differentiator operable to differentiate the output from the acceleration sensor.

Further, the above-mentioned suspension control apparatus may comprise a target pitch angle calculator operable to calculate a target pitch angle based on the lateral jerk, and may control the actuator so that the vehicle has a pitch of the target pitch angle. Since it is possible to emulate a pitch change when a skilled driver operates a vehicle by adjusting the target pitch angle according to the lateral jerk, even an unskilled driver can obtain the excellent driving feeling.

Hereinafter, a suspension control apparatus according to a first embodiment of the present invention will be described with reference to FIGS. 1 to 4.

Figure 1:
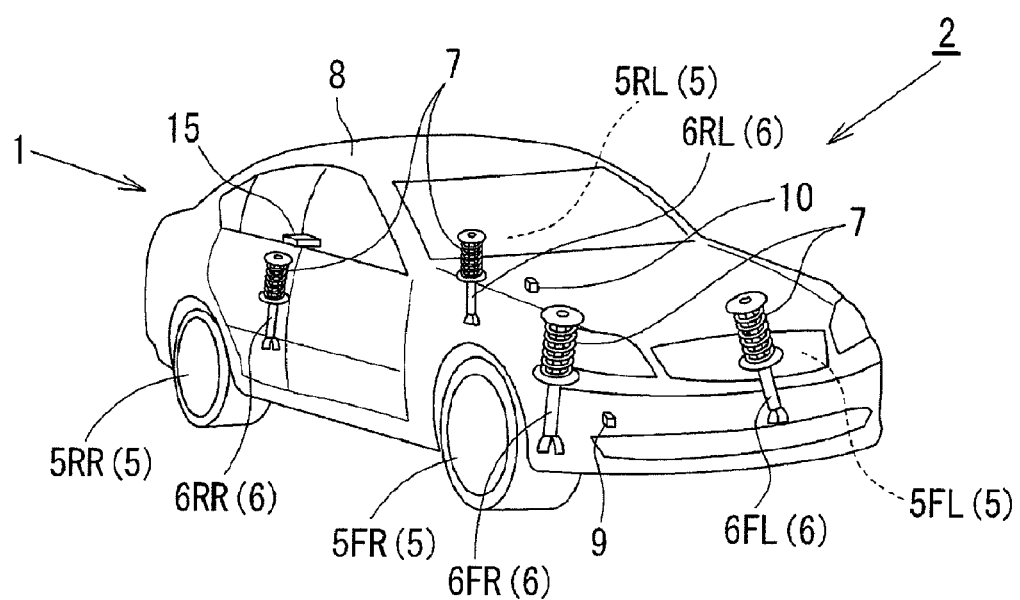
FIG. 1 schematically illustrates a suspension control apparatus according to a first embodiment of the present invention, and a motor vehicle employing the suspension control apparatus.

FIG. 1 schematically illustrates the suspension control apparatus according to the first embodiment, and a motor vehicle 2 employing the suspension control apparatus.

Figure 2:
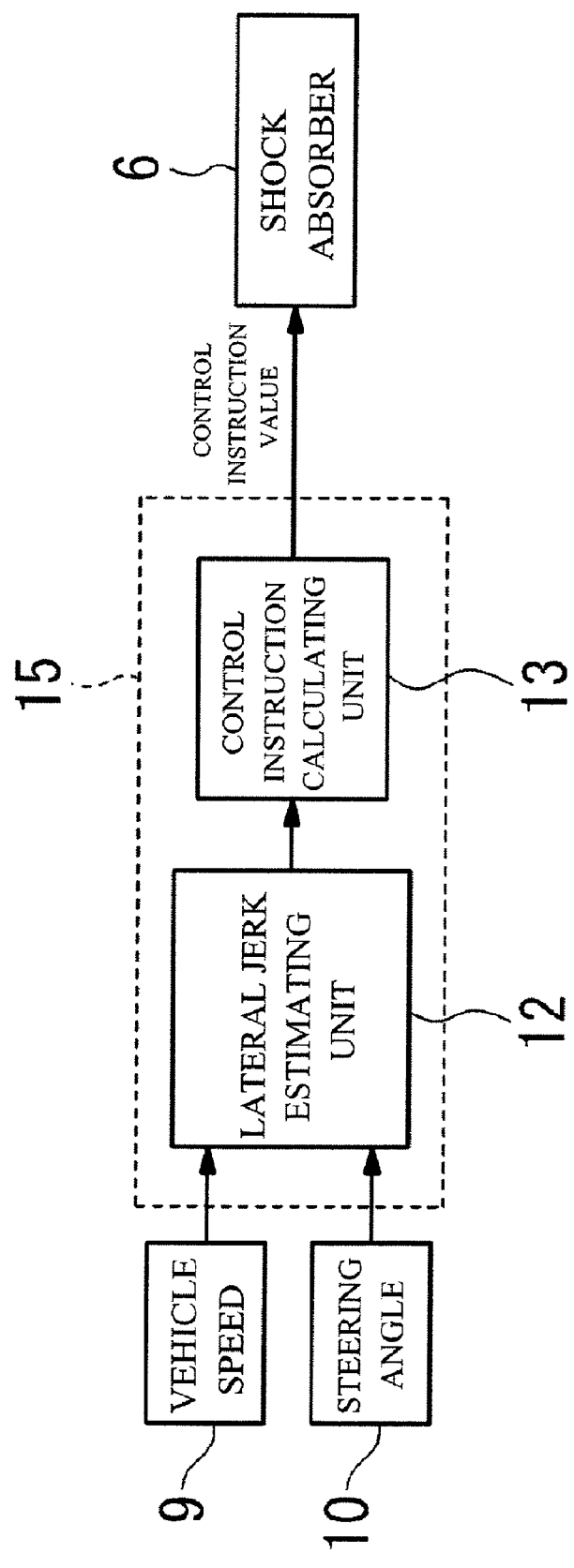
FIG. 2 is a block diagram illustrating the configuration of a controller shown in FIG. 1.
Figure 3:
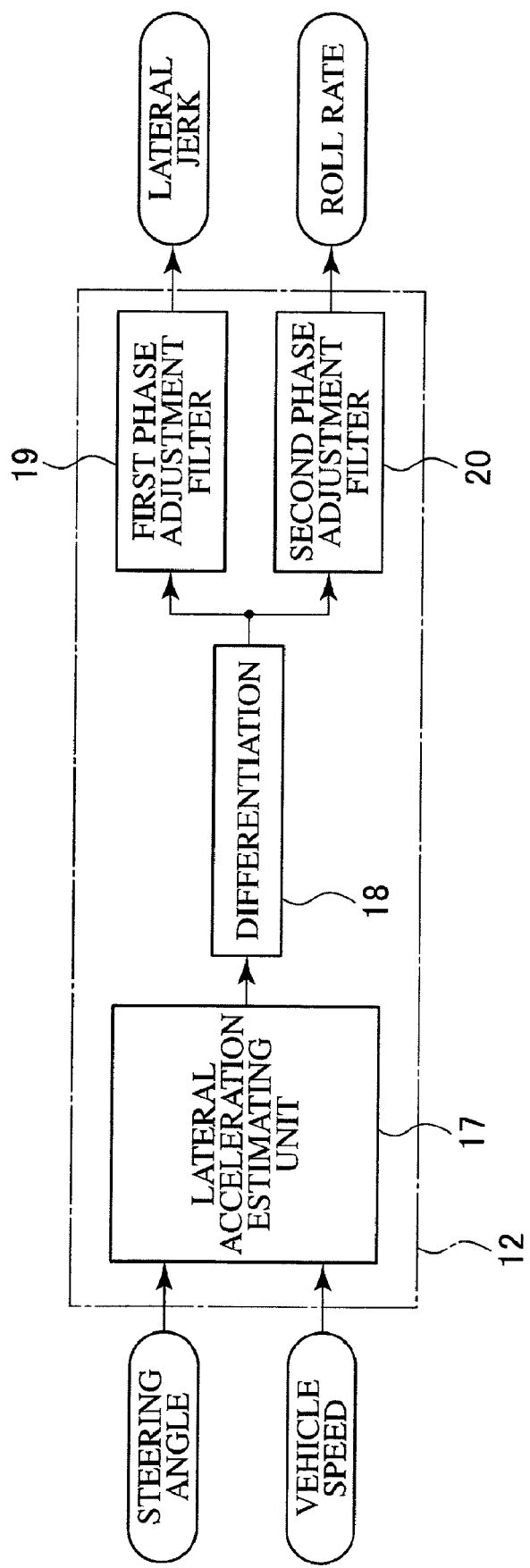
FIG. 3 is a block diagram schematically illustrating the configuration of a lateral jerk estimating unit shown in FIG. 2.
Figure 4:
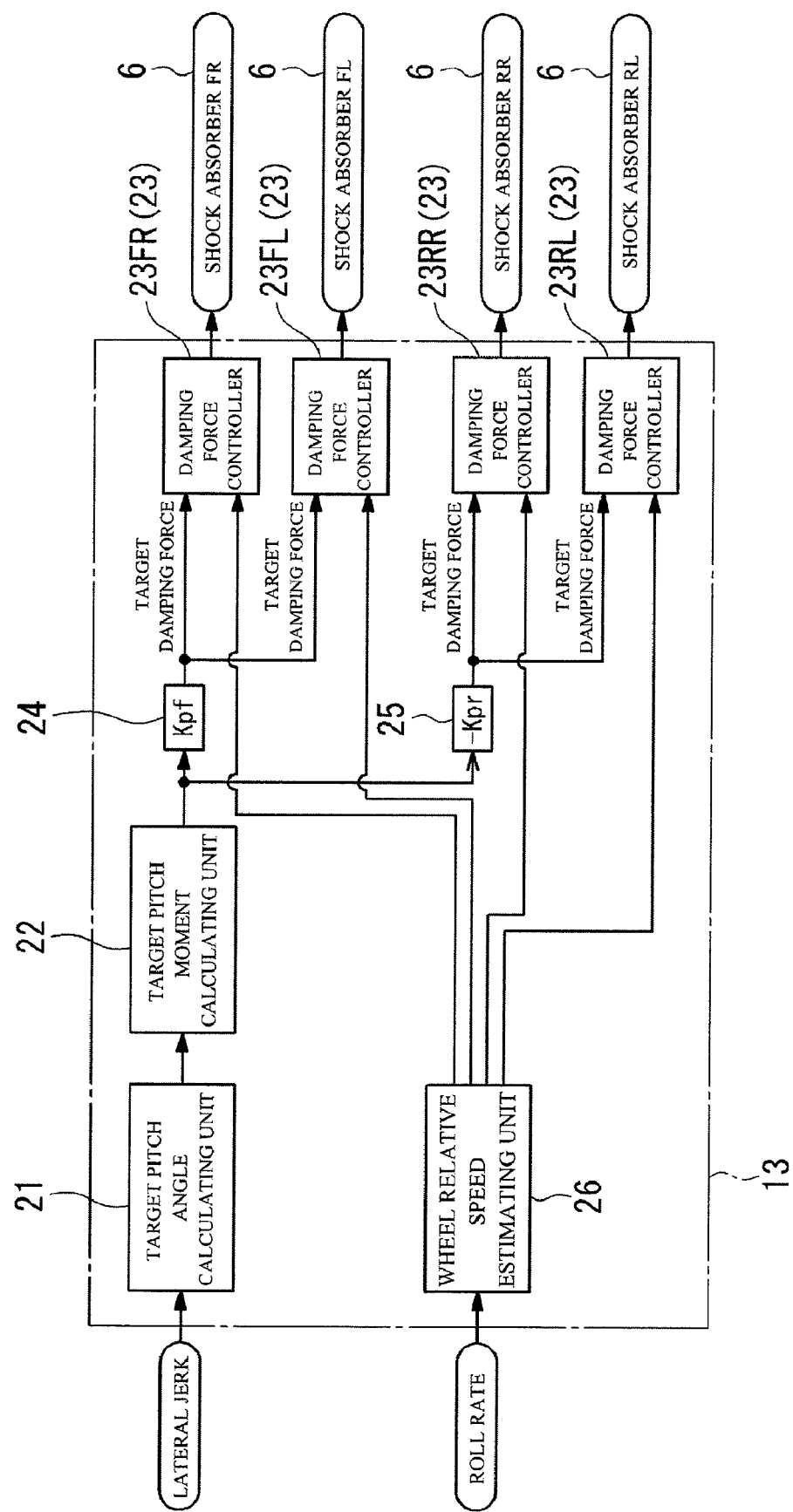
FIG. 4 is a block diagram schematically illustrating the configuration of a control instruction calculating unit shown in FIG. 2.

FIG. 2 is a bloc diagram illustrating the configuration of a controller (first embodiment controller) included in the suspension control apparatus shown in FIG. 1. FIG. 3 is a block diagram schematically illustrating the configuration of a lateral jerk estimating unit shown in FIG. 2. FIG. 4 is a block diagram schematically illustrating the configuration of a control instruction calculating unit shown in FIG. 2.

Referring to FIGS. 1 and 2, a suspension control apparatus 1 according to the first embodiment is mounted on the motor vehicle 2. Wheels 5 of the motor vehicle 2 (referred to as "front right wheel 5FR", "front left wheel 5FL", "rear right wheel 5RR", and "rear left wheel 5RL" as appropriate) are equipped with damping force adjustable shock absorbers disposed as front left, front right, rear left, and rear right shock absorbers 6FL, 6FR, 6RL, and 6RR (collectively referred to as "shock absorbers 6" as appropriate). Springs 7 are attached to the outer circumferences of the shock absorbers 6. The shock absorbers 6 and the springs 7 are respectively disposed between a vehicle body 8 and the wheels 5, and serve to damp upward and downward movements of the wheels 5. The vehicle body 8 is provided with a vehicle speed sensor 9 operable to detect a vehicle speed, and a steering angle sensor 10 operable to detect a steering angle.

In the present embodiment, the shock absorbers 6 constitute the actuator (damping force adjustable shock absorber).

The suspension control apparatus 1 mounted on the motor vehicle 2 comprises a controller (hereinafter referred to as "first embodiment controller 15") constituted by a lateral jerk estimating unit 12 and a control instruction calculating unit 13. The lateral jerk estimating unit 12 estimates a lateral jerk and a roll rate of the motor vehicle 2 with use of vehicle speed data from the vehicle speed sensor 9 and steering angle data from the steering angle sensor 10. The control instruction calculating unit 13 generates a control instruction value (also referred to as "control instruction" and "instruction value" as appropriate) to be supplied to each of the shock absorbers 6 based on the lateral jerk from the lateral jerk estimating unit 12. In the present embodiment, the lateral jerk estimating unit 12 constitutes the lateral jerk detector, and the first embodiment controller 15 constitutes the suspension controller.

As shown in FIG. 3, the lateral jerk estimating unit 12 comprises a lateral acceleration estimating unit 17, a differentiator circuit 18, and first and second phase adjustment filters 19 and 20.

The lateral acceleration estimating unit 17 calculates an estimated lateral acceleration from the vehicle speed data from the vehicle speed sensor 9 and the steering angel data from the steering angle sensor 10.

The differentiator circuit 18 calculates a lateral jerk by differentiating the estimated lateral acceleration calculated by the lateral acceleration estimating unit 17.

Assuming that the motor vehicle 2 has a linear model and ignoring the dynamic characteristic thereof, the estimated lateral acceleration (hereinafter described with use of the character "$a_y$" as appropriate) can be expressed by the following equation:

$$a_y = [1/(1+AV^2)] * [V^2/(Lh)] \delta_f \quad (1)$$

in which V represents a vehicle speed [m/s], A represents a stability factor [s²/m²], $\delta_f$ represents a front wheel steering angle [rad], and Lh represents a wheelbase [m].

The lateral jerk is estimated by differentiating the estimated lateral acceleration calculated in the above-mentioned manner.

When the lateral jerk is estimated from the steering angle, a phase lead occurs, since the dynamics of the motor vehicle 2 is ignored. Therefore, a filter (the first phase adjustment filter 19) for adjusting the phase in consideration of the dynamics is used to adjust the phase so as to correspond to the actual lateral jerk. In addition, a further phase lag is expected for the roll rate, compared to the lateral acceleration. Therefore, another filter (the second phase adjustment filter 20) than the first phase adjustment filter 19 is used to adjust the phase and gain to estimate and output the roll rate. The gains may be determined from an estimation, but it is desirable to find out appropriate values from actual vehicle tests.

The control instruction calculating unit 13 calculates control instruction values (control instructions) to the shock absorbers 6 for the respective wheels from the lateral jerk and the roll rate estimated by the lateral jerk estimating unit 12.

For increasing a pitch angle, the damping forces are adjusted such that the shock absorbers 6 at the front side are soft in compression (compression soft mode) but hard in extension (extension hard mode), while the shock absorbers 6 at the rear side are soft in extension (extension soft mode) but hard in compression (compression hard mode).

For reducing a pitch angle, the damping forces are adjusted such that the shock absorbers 6 at the front side are soft in extension (extension soft mode) but hard in compression (compression hard mode), while the shock absorbers 6 at the rear side are soft in compression (compression soft mode) but hard in extension (extension hard mode).

Now, the configuration of the control instruction calculating unit 13 will be described with reference to FIG. 4.

Referring to FIG. 4, the control instruction calculating unit 13 comprises a target pitch angle calculating unit 21 operable to calculate a target pitch angle from the estimated lateral jerk; a target pitch moment calculating unit 22 operable to calculate a target pitch moment based on the target pitch angle output from the target pitch angle calculating unit 21; and front left, front right, rear left and rear right damping force controllers 23FL, 23FR, 23RL and 23RR (hereinafter collectively referred to as "damping force controllers 23") operable to output control instruction values to generate damping forces at the shock absorbers 6 (the front left, front right, rear left and rear right shock absorbers 6FL, 6FR, 6RL and 6RR) disposed for the respective four wheels. In the present embodiment, the target pitch angle calculating unit 21 constitutes the target pitch angle calculator.

A predetermined map which contains a pitch moment required to accomplish a target pitch for each vehicle type or a calculating formula predetermined for each vehicle type for calculating a pitch moment required to accomplish a target pitch is stored, and the target pitch moment calculating unit 22 calculates the target pitch moment from the map or the calculating formula with use of the calculation result of the target pitch angle calculating unit 21. In this case, actually, the required pitch moment varies according to other conditions such as longitudinal acceleration/deceleration, but in the present embodiment, the target pitch moment is determined only from the value of the lateral jerk to adjust the damping forces.

For performing a more precise control, a longitudinal acceleration sensor may be disposed at the vehicle (or a value from the vehicle speed sensor may be differentiated), and the resulting value therefrom may be used for a correction in which a pitch moment generated from the lateral acceleration is subtracted from the above-mentioned target pitch moment. Further, a pitch angle estimating unit 36 in a second embodiment, which will be described later, may be disposed and be used for a feedback control.

The control instruction calculating unit 13 further comprises a multiplier circuit (hereinafter referred to as "first multiplier circuit 24") operable to multiply the target pitch moment from the target pitch moment calculating unit 22 by a gain "Kpf", and output the value (hereinafter referred to as "front-wheel-side target damping force") obtained from this multiplication to the damping force controllers 23FL and 23FR of the front left and front right wheel sides; and a multiplier circuit (hereinafter referred to as "second multiplier circuit 25") operable to multiply the target pitch moment from the target pitch moment calculating unit 22 by a gain "−Kpr", and output the value (hereinafter referred to as "rearwheel-side target damping force") obtained from this multiplication to the damping force controllers 23RL and 23RR of the rear left and rear right wheel sides.

The target damping force has a positive value when it is soft in compression but hard in extension, while the target damping force has a negative value when it is soft in extension but hard in compression.

Further, the control instruction calculating unit 13 comprises a wheel relative speed estimating unit 26 operable to estimate relative speeds of the respective wheels (wheel relative speeds) from the roll rate. The wheel relative speeds estimated by the wheel relative speed estimating unit 26 are input into the damping force controllers 23FL, 23FR, 23RL and 23RR of the front left, front right, rear left and rear right wheel sides.

In the control instruction calculating unit 13, first, the target pitch angle calculating unit 21 calculates the target pitch angle by multiplying the lateral jerk by a predetermined value (multiply it by a gain). The gain of a predetermined value is set such that a target pitch angle for generating a front-down state is obtained when the lateral jerk and the lateral acceleration have a same sign (both have a plus sign or both have a minus sign). The fact that the lateral jerk and the lateral acceleration have a same sign means that roll occurs and the roll is increasing, that is, a driver progressively turns the steering wheel. This control manner can generate a front-down state regardless of whether the driver turns the steering wheel to the left or right, whereby the roll and the pitch can be harmonized so that the driver can obtain an improved driving feeling.

The target pitch moment is calculated from the target pitch angle so as to accomplish the target pitch angle, and the target damping forces are issued to the respective wheels according to the calculated target pitch moment. At this time, for generating a pitch moment, the target damping forces at the front side and the rear side should have opposite signs (or just making a difference between the target damping forces at the front side and the rear side also works).

Figure 13:
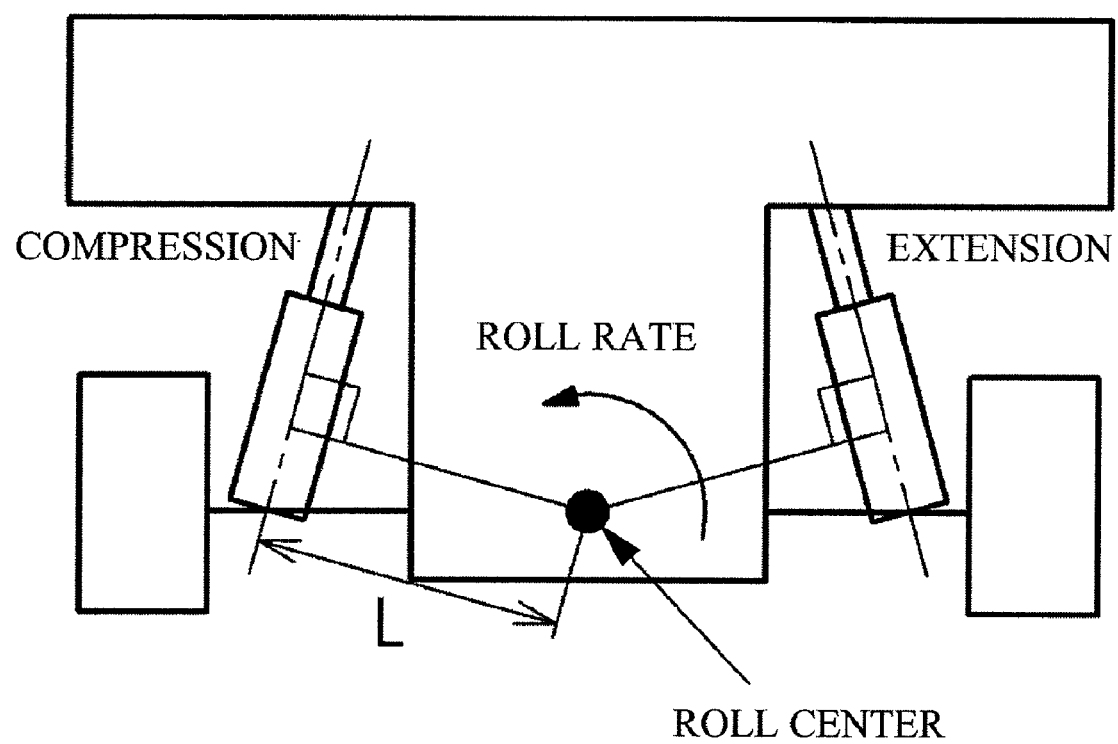
FIG. 13 illustrates a principle for calculating a relative speed from a roll rate.

Further, the wheel relative speed estimating unit 26 estimates the wheel relative speeds as mentioned above. As shown in FIG. 13, when the vehicle is running on a flat road and the roll motion is generated only from a steering operation, the following equation (2) can be established with regard to the roll rate and the relative speed.

$$\text{relative speed [m/s]} = \text{roll rate [rad/s]} * \text{shock absorber to roll center distance L [m]} \quad (2)$$

It should be noted that the front side and the rear side have different sock absorber to roll center distances (the distance between the attachment portions of the left and right shock absorbers at the front side, and the distance between the attachment portions of the left and right shock absorbers at the rear side), whereby this distance is calculated for each of the front and rear sides. Further, the data is output such that the relative speeds at the right and left sides have opposite signs.

The damping force controllers 23 (23FL, 23FR, 23RL and 23RR) output instruction values to the shock absorbers 6FL, 6FR, 6RL and 6RR (actuator) at the respective wheels from the calculated target damping forces and relative speeds, with use of a damping force characteristic map indicating the relationship among the damping force, the instruction value and the relative speed.

As mentioned above, the shock absorbers 6 are controlled with use of the lateral jerk and the roll rate estimated based on the steering angle and the vehicle speed, whereby it is possible to generate a pitch behavior in coordination with the lateral jerk so that the driver can have an improved driving feeling.

In the first embodiment, the lateral acceleration is calculated with use of the vehicle speed and the steering angle. Instead, the lateral acceleration may be calculated by any of the following methods (a) to (c).

(a) Calculate the lateral acceleration from a yaw rate and a vehicle speed
(b) Calculate the lateral acceleration from left and right wheel speeds and a vehicle speed
(c) Obtain the lateral acceleration by directly measuring it with use of a lateral acceleration sensor.

Further, in the first embodiment, the lateral jerk is calculated by differentiating the lateral acceleration. Instead, the lateral jerk may be calculated from any of the physical quantities listed in the following items (i) to (vi).

(i) Differentiation of an estimated lateral acceleration (for example, calculated from a vehicle speed and a steering angle, or calculated from a yaw rate and a vehicle speed)
(ii) Roll rate (integration of a difference between left and right accelerations each obtained from a gyroscope or a vertical acceleration sensor)
(iii) Difference between left and right relative speeds (differentiation of a detection value of a vehicle height sensor, or integration of a sprung-side/unsprung-side relative acceleration)
(iv) Differentiation of a left/light shift amount of a tire vertical load
(v) Differentiation of an average value of lateral forces of the tires at the four wheels
(vi) Differentiation of a difference between a left-side wheel speed and a right-side wheel speed Further, in the first embodiment, the relative speed is calculated from the roll rate. Instead, the relative speed may be calculated from any of the physical quantities listed in the following items (i) to (iv).

Figure 5:
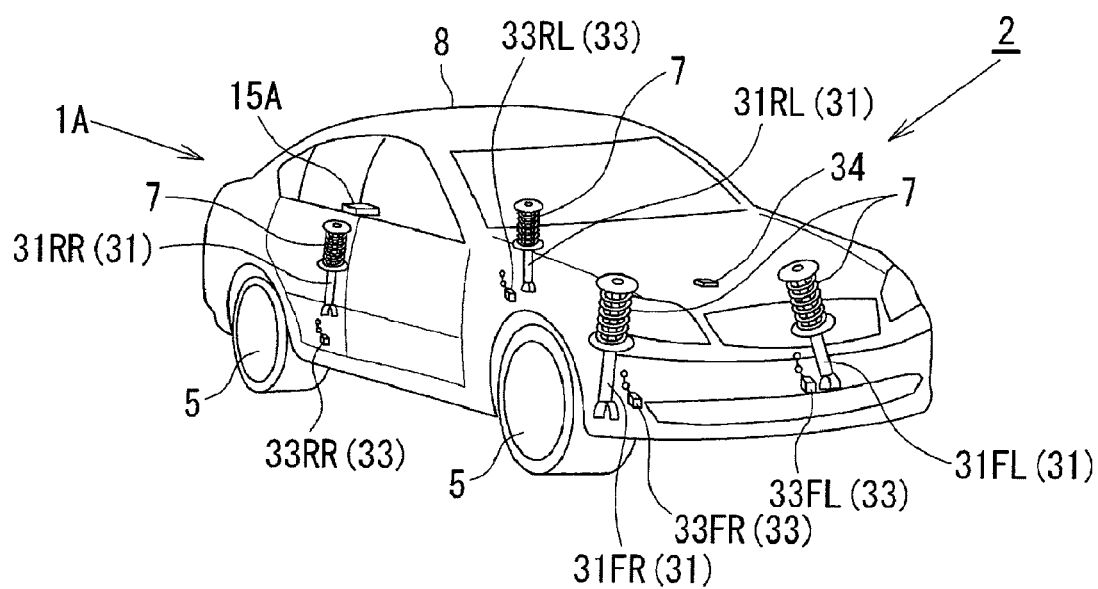
FIG. 5 schematically illustrates a suspension control apparatus according to a second embodiment of the present invention, and a motor vehicle employing the suspension control apparatus.

(i) Differentiation of vehicle heights at the wheels
(ii) Integration of a difference between a sprung-side vertical acceleration and an unsprung-side vertical acceleration
(iii) Estimated value by an observer with use of a sprung-side vertical acceleration
(iv) Integration of a sprung-side vertical acceleration Next, a second embodiment of the present invention will be described with reference to FIG. 5.

A suspension control apparatus 1A according to the second embodiment is different from the first embodiment, mainly in terms of the following points (a) to (d). (a) Instead of the front left, front right, rear left and rear right shock absorbers 6FL, 6FR, 6RL and 6RR used in the first embodiment, the second embodiment comprises active suspensions 31FL, 31FR, 31RL and 31RR (hereinafter collectively referred to as "active suspensions 31" or "actuators 31" as appropriate) which may be embodied by, for example, hydraulic cylinders. (b) The steering angle sensor 10 and the vehicle speed sensor 9 used in the first embodiment are omitted from the second embodiment. (c) The second embodiment comprises vehicle height sensors 33 (hereinafter referred to as "front left, front right, rear left and rear right vehicle height sensors 33FL, 33FR, 33RL and 33RR" as appropriate), and a lateral acceleration sensor 34. (d) Instead of the first embodiment controller 15 used in the first embodiment, the second embodiment employs another controller (hereinafter referred to as "second embodiment controller 15A"). In the second embodiment, the second embodiment controller 15A constitutes the suspension controller.

The vehicle height sensors 33 are disposed for the respective wheels to detect vehicle heights near the respective wheels.

Figure 6:
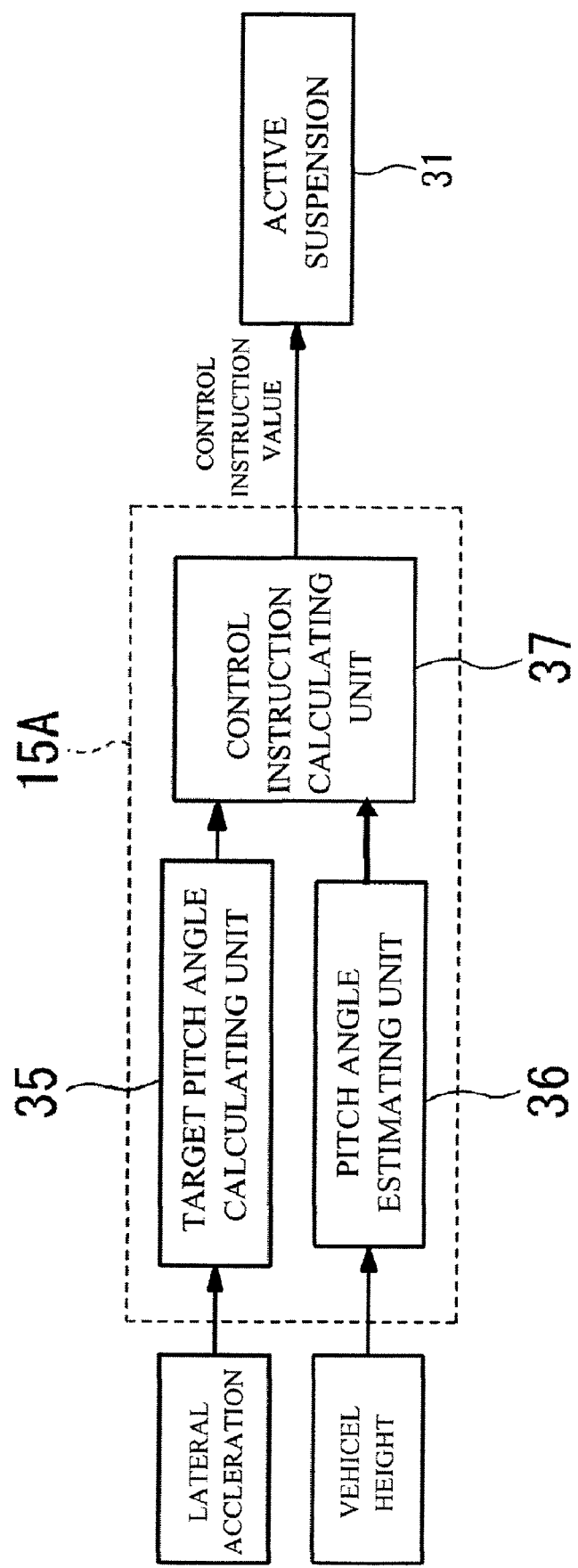
FIG. 6 is a block diagram illustrating the configuration of a controller shown in FIG. 5.

As shown in FIG. 6, the second embodiment controller 15A comprises a target pitch angle calculating unit 35 operable to calculate a target pitch angle from a detection value of the lateral acceleration sensor 34; a pitch angle estimating unit 36 operable to estimate an actual pitch angle from the vehicle heights detected by the vehicle height sensors 33; and a control instruction calculating unit 37 operable to calculate control instruction values based on the data from the target pitch angle calculating unit 35 and the pitch angle estimating unit 36, and output them to the active suspensions 31. In the second embodiment, the target pitch angle calculating unit 35 constitutes the target pitch angle calculator, the pitch angle estimating unit 36 constitutes the pitch angle detector, and the active suspensions 31 constitute the actuator.

Figure 7:
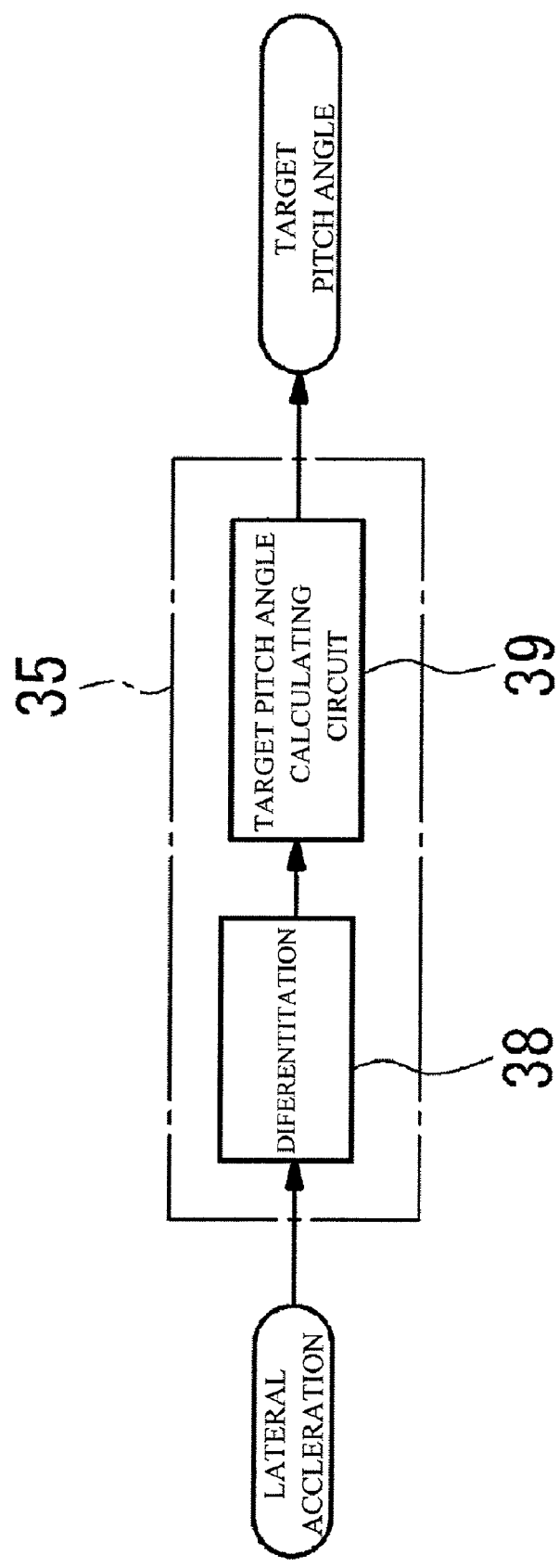
FIG. 7 is a block diagram schematically illustrating the configuration of a target pitch angle calculating unit shown in FIG. 6.

As shown in FIG. 7, the target pitch angle calculating unit 35 comprises a differentiator circuit 38 operable to carry out differentiation calculation by receiving an input of the detection value from the lateral acceleration sensor 34; and a target pitch angle calculating circuit 39 operable to calculate a target pitch angle by receiving an input of the calculation result (lateral jerk) from the differentiator circuit 38. The target pitch angle calculating unit 35 outputs the target pitch angle calculated by the target pitch angle calculating circuit 39 to the control instruction calculating unit 37.

Figure 8:
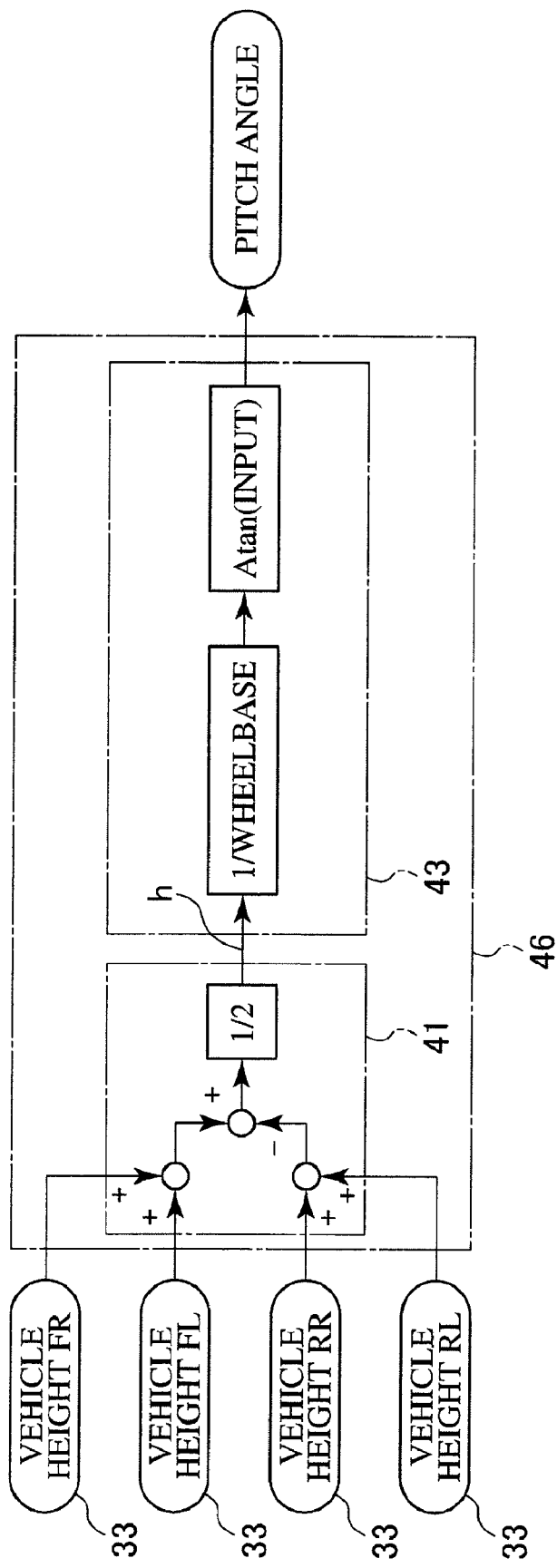
FIG. 8 is a block diagram schematically illustrating the configuration of a pitch angle estimating unit shown in FIG. 6.
Figure 9:
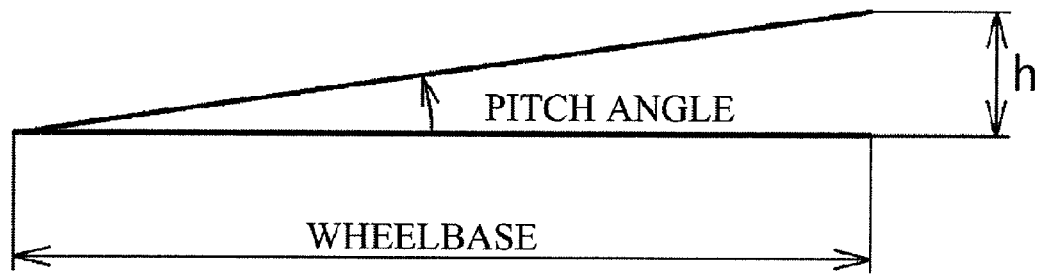
FIG. 9 illustrates a method of calculating a pitch angle by a pitch angle calculating circuit shown in FIG. 8.

As shown in FIG. 8, the pitch angle estimating unit 36 comprises a front-rear vehicle height difference calculating circuit 41 operable to calculate a difference h between front and rear vehicle heights from the vehicle heights (vehicle heights at the front left, front right, rear left and rear right wheel sides) detected by the vehicle height sensors 33 disposed for the front left, front right, rear left and rear right wheels 5FL, 5FR, 5RL and 5RR; and a pitch angle calculating circuit 43. The pitch angle calculating circuit 43 calculates a pitch angle from the front-rear vehicle height difference h based on the geometrical relationship among the wheelbase, the front-rear vehicle height difference h and the pitch angle as shown in FIG. 9. More specifically, as shown in FIG. 8, the pitch angle calculating circuit 43 calculates a tangent value of the pitch angle (tan(pitch angle)) by dividing the front-rear vehicle height difference h calculated by the front-rear vehicle height difference calculating circuit 41 by the wheelbase, and obtains a pitch angle by calculating an arc tangent value (arctan) of the calculated tangent value. The pitch angle may be directly measured with use of a gyro sensor, instead of using the pitch angle estimating unit 36.

The control instruction calculating unit 37 performs a feedback control so that the pitch angle coincides with the calculated target pitch angle, and outputs control instruction values to the active suspensions 31 at the respective wheels.

Figure 10:
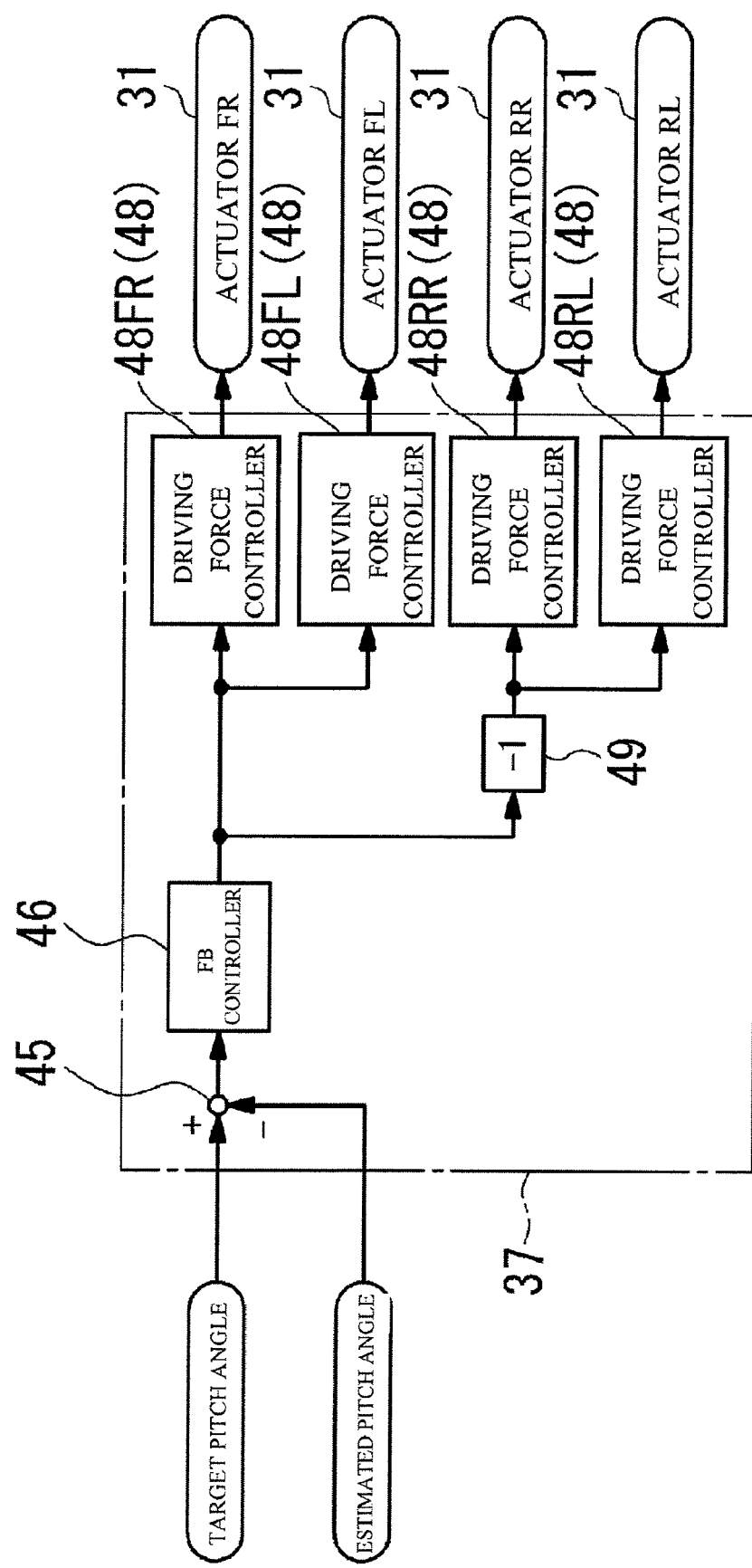
FIG. 10 is a block diagram schematically illustrating the configuration of a control instruction calculating unit shown in FIG. 6.

More specifically, as shown in FIG. 10, the control instruction calculating unit 37 comprises a deviation calculating unit 45 operable to calculate a deviation between the target pitch angle and the pitch angle; a FB controller (feedback controller) 46 operable to calculate a control instruction value based on the calculated deviation; front left, front right, rear left and rear right driving force controllers 48FL, 48FR, 48RL and 48RR (collectively referred to as "driving force controllers 48" as appropriate) operable to output control instruction values to drive the active suspensions 31 (the front left, front right, rear left and rear right actuators) disposed for the respective four wheels; and a reversing circuit 49 disposed such that reversed control instructions are respectively output to the front left and right driving force controllers 48FL and 48FR, and the rear left and right driving force controllers 48RL and 48RR. In this way, the control instruction calculating unit 37 outputs control instruction values to the active suspensions 31 at the respective wheels, as mentioned above.

According to the above-discussed second embodiment, the active suspensions 31 (actuator) are controlled with use of the lateral jerk calculated from the lateral acceleration and the vehicle heights at the respective wheels 5, whereby it is possible to generate a pitch behavior in coordination with the lateral jerk and therefore generate a roll behavior and a pitch behavior in coordination with each other, so that a driver can have an improved driving feeling.

Figure 11:
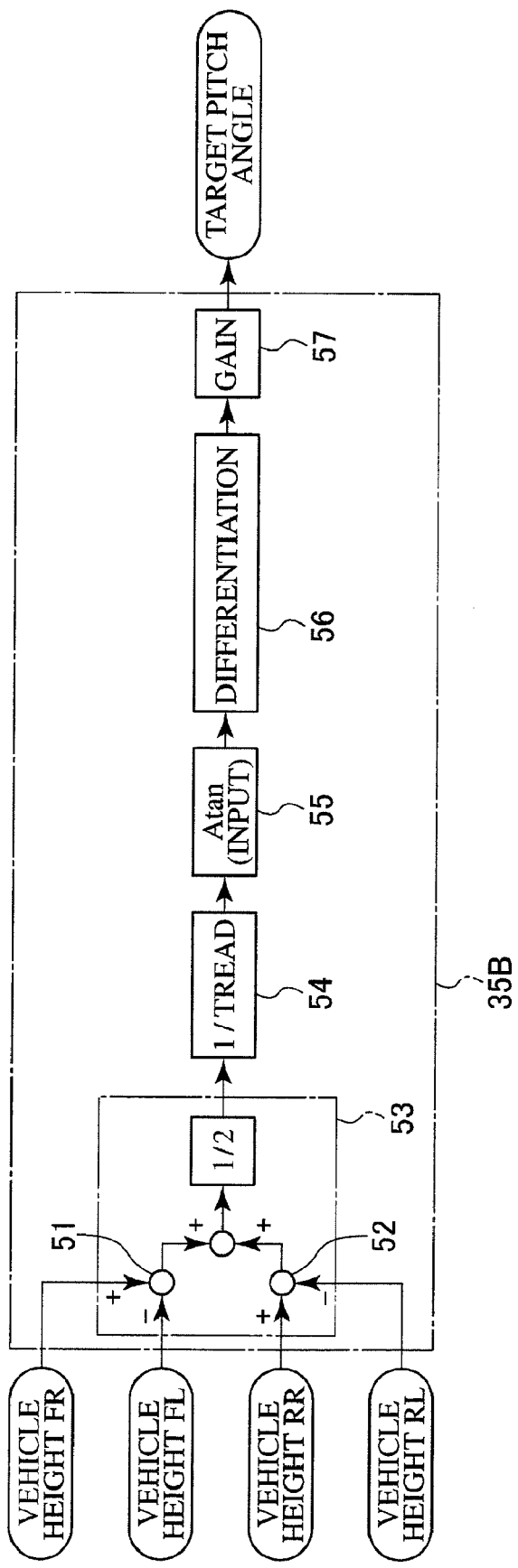
FIG. 11 illustrates an example in which a target pitch angle is calculated in a different manner from that shown in FIG. 7.

In the second embodiment, the target pitch angle is calculated from the lateral acceleration. Instead, the target pitch angle may be calculated from vehicle heights, and an example of this case is shown in FIG. 11. Referring to FIG. 11, reference numeral 35B denotes a target pitch angle calculating unit disposed instead of the target pitch angle calculating unit 35 shown in FIGS. 6 and 7. The target pitch angle calculating unit 35B calculates the target pitch angle from the vehicle heights (the front left, front right, rear left and rear right vehicle heights) detected by the vehicle height sensors 33 (the front left, front right, rear left and rear right vehicle height sensors 33FL, 33FR, 33RL and 33RR) disposed for the front left, front right, rear left and rear right wheels.

More specifically, the target pitch angle calculating unit 35B comprises a front-wheel-side difference circuit 51 operable to calculate a difference between vehicle heights at the front left wheel side and the front right wheel side; a rear-wheel-side difference circuit 52 operable to calculate a difference between vehicle heights at the rear left wheel side and the rear right wheel side; a averaging circuit 53 operable to average the calculated values from the front-wheel-side difference circuit 51 and the rear-wheel-side difference circuit 52; a dividing circuit 54 operable to divide the value calculated by the averaging circuit 53 by a tread (distance between the centers of the left and right wheels) and output the resulting value (hereinafter referred to as "divided value" for convenience of description); an arctangent processing circuit 55 operable to calculate an arctangent (hereinafter also referred to as "arctan" or "Atan") of the divided value (hereinafter also referred to as "input") by receiving an input of the divided value from the dividing circuit 54; a differentiator circuit 56 operable to differentiate the value calculated by the art tangent processing circuit 55, and a multiplier circuit 57 operable to calculate the target pitch angle by multiplying the data calculated by the differentiator circuit 56 by a desired gain. By operations of these circuits, the target pitch angle calculating unit 35B calculates the target pitch angle.

Figure 14:
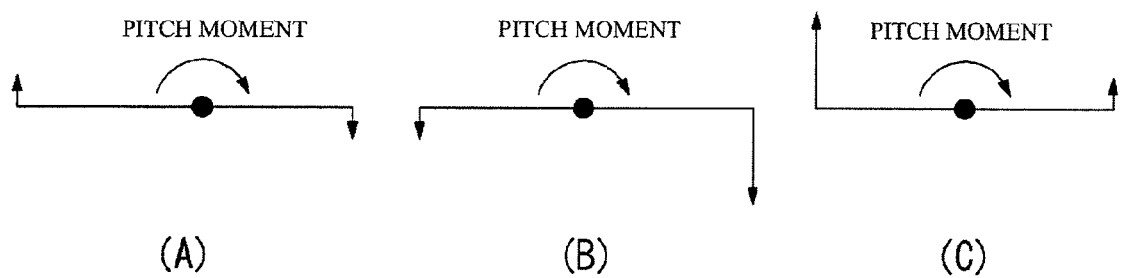
FIG. 14 illustrates the relationship between driving forces generated at the front and rear sides, and a pitch moment generated therefrom.

In the second embodiment, the pitch moment is generated by issuing opposite driving forces to the front side and the rear side with use of the reversing circuit 49 disposed such that the control instruction values for the front side and the rear side become opposite from each other (refer to FIG. 14(A)). Instead, the pitch moment may be generated by making a difference between the control instruction values for the front side and the rear side, as shown in FIGS. 14(B) and (C).

In the above-mentioned embodiments, the suspensions are embodied by the damping force adjustable shock absorbers 6FL, 6FR, 6RL and 6RR [the first embodiment] or the active suspensions 31 [the second embodiment]. Instead, the suspensions may be embodied by air suspensions.

In the above-mentioned embodiments, the pitch is controlled. Instead, a roll stiffness may be controlled according to the lateral jerk such that the roll stiffness at the front side becomes higher than the roll stiffness at the rear side when the lateral jerk and the lateral acceleration have a same sign, whereby the front-down state is generated as in the case of controlling the pitch, so that a driver can obtain the excellent driving feeling.

Further, the above-mentioned suspension control can be employed in a vehicle having the function of controlling a cornering operation by adjusting a longitudinal acceleration through a control of the engine, motor and brake. In this case, it is possible to reduce the amount of the control of a longitudinal acceleration and therefore reduce a speed change, and in addition to that, it is possible to improve fuel efficiency.

According to the above-discussed embodiments of the present invention, it is possible to provide a suspension control apparatus enabling a driver to have the excellent driving feeling during cornering.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The entire disclosure of Japanese Patent Application No. 2009-181446 filed on Aug. 4, 2009 including specification, claims, drawings and summary is incorporated herein by reference in its entirety.

What is claimed is:

1. A suspension control apparatus for controlling an actuator disposed between a vehicle body and a wheel of a vehicle, the suspension control apparatus comprising:
   a lateral acceleration detector operable to detect a lateral acceleration;
   a lateral jerk detector operable to detect a lateral jerk; and
   a suspension controller operable to control the actuator to change a pitch of the vehicle based the detected lateral acceleration and lateral jerk,
   wherein the suspension controller increases a pitch angle as an absolute value of the lateral jerk is increased.

2. The suspension control apparatus according to claim 1, further comprising:
   a target pitch angle calculator operable to calculate a target pitch angle based on the lateral jerk detected by the lateral jerk detector,
   wherein the suspension controller controls the actuator based on the target pitch angle calculated by the target pitch angle calculator.

3. The suspension control apparatus according to claim 2, further comprising:
   a pitch angle detector operable to detect a pitch angle of the vehicle;
   wherein the suspension controller controls the actuator based on the target pitch angle calculated by the target pitch angle calculator and the pitch angle detected by the pitch angle detector.

4. The suspension control apparatus according to claim 1, wherein the actuator comprises a damping force adjustable shock absorber capable of adjusting a damping force to be generated thereby.

5. The suspension control apparatus according to claim 1, wherein the actuator comprises an air suspension configured to generate a force with use of an air pressure.

6. A suspension control apparatus for controlling an actuator disposed between a vehicle body and a wheel of a vehicle, the suspension control apparatus comprising:
   a lateral acceleration detector operable to detect a lateral acceleration;
   a lateral jerk detector operable to detect a lateral jerk; and
   a suspension controller operable to control the actuator to change a pitch of the vehicle based the detected lateral acceleration and lateral jerk,
   wherein the actuator is controlled such that the vehicle has a pitch of a front-down state when the lateral jerk and the lateral acceleration have a same sign.

7. The suspension control apparatus according to claim 6, wherein the actuator is controlled such that the vehicle has a pitch of a front-down state when a driver progressively turns a steering wheel of the vehicle.

* * * * *